United States Patent [19]

Colket, III et al.

[11] Patent Number: 5,235,804
[45] Date of Patent: Aug. 17, 1993

[54] METHOD AND SYSTEM FOR COMBUSTING HYDROCARBON FUELS WITH LOW POLLUTANT EMISSIONS BY CONTROLLABLY EXTRACTING HEAT FROM THE CATALYTIC OXIDATION STAGE

[75] Inventors: Meredith B. Colket, III, Simsbury; Arthur S. Kesten, West Hartford; Joseph J. Sangiovanni, West Suffield; Martin F. Zabielski, Manchester; Dennis R. Pandy, South Windsor; Daniel J. Seery, Glastonbury, all of Conn.

[73] Assignee: United Technologies Corporation, Hartford, Conn.

[21] Appl. No.: 701,426

[22] Filed: May 15, 1991

[51] Int. Cl.$^5$ .............................................. F02G 3/00
[52] U.S. Cl. .................................... 60/39.02; 60/723; 60/732
[58] Field of Search ............... 60/723, 39.822, 732, 60/737, 746, 39.02, 39.06; 431/7, 170, 328

[56] References Cited

U.S. PATENT DOCUMENTS

| | | |
|---|---|---|
| 2,655,786 | 10/1953 | Carr .................................... 60/39.02 |
| 2,947,600 | 8/1960 | Clayton . |
| 3,433,218 | 3/1969 | Von Wiesenthal . |
| 3,705,492 | 12/1972 | Vickers .................................. 60/760 |
| 3,797,231 | 3/1974 | McLean . |
| 3,846,979 | 11/1974 | Pfefferle . |
| 3,897,225 | 7/1975 | Henkel et al. . |
| 3,928,961 | 12/1975 | Pfefferle . |
| 3,940,923 | 3/1976 | Pfefferle . |
| 3,966,391 | 6/1976 | Hindin et al. . |
| 3,975,900 | 8/1976 | Pfefferle ................................ 60/723 |
| 4,040,252 | 8/1977 | Mosier et al. . |
| 4,047,877 | 9/1977 | Flanagan . |
| 4,054,407 | 10/1977 | Carrubba et al. ...................... 431/10 |
| 4,118,171 | 10/1978 | Flanagan et al. . |
| 4,154,567 | 5/1979 | Dahmen . |
| 4,179,880 | 12/1979 | Schirmer . |
| 4,202,168 | 5/1980 | Acheson et al. . |
| 4,285,193 | 8/1981 | Shaw et al. . |
| 4,459,126 | 7/1984 | Krill et al. . |
| 4,534,165 | 8/1985 | Davis, Jr. et al. . |
| 4,731,989 | 3/1988 | Furuya et al. . |
| 4,787,208 | 11/1988 | DeCorso . |
| 4,864,811 | 9/1989 | Pfefferle .............................. 60/39.06 |
| 4,875,850 | 10/1989 | Cagnon et al. . |
| 4,983,364 | 1/1991 | Buck et al. . |
| 4,988,287 | 1/1991 | Stegelman et al. . |

FOREIGN PATENT DOCUMENTS

| | | |
|---|---|---|
| 0351094 | 1/1990 | European Pat. Off. . |
| 2103008 | 8/1972 | Fed. Rep. of Germany . |
| 2618961 | 11/1976 | Fed. Rep. of Germany . |
| 1460312 | 1/1977 | United Kingdom . |

OTHER PUBLICATIONS

International Search Report for PCT/US92/03771, mailed 02 Oct. 1992; for the PCT application that corresponds to United States Application 07/701,426 (the present application).

Lefebvre, Athur H., *Gas Turbine Combustion*, McGraw-Hill, New York, 1983. pp. 44–57, 481–485.

*Primary Examiner*—Richard A. Bertsch
*Assistant Examiner*—Timothy S. Thorpe
*Attorney, Agent, or Firm*—George J. Romanik

[57] ABSTRACT

A method of combusting a hydrocarbon fuel includes mixing the fuel with a first air stream to form a fuel/air mixture having an equivalence ratio of greater than 1 and partially oxidizing the fuel by contacting it with an oxidation catalyst to generate a heat of reaction and a partial oxidation product stream. The partial oxidation product stream is mixed with a second air stream and completely combusted in a main combustor at a condition at which appreciable quantities of thermal $NO_x$ are not formed to generate an effluent gas stream, thereby generating an effluent gas stream containing decreased amounts of thermal and prompt $NO_x$. A system for combusting a hydrocarbon fuel includes, in combination, means for mixing the fuel with a first air stream, a catalytic oxidation stage containing an oxidation catalyst, means for mixing the partial oxidation product stream with a second air stream, and a main combustor capable of completely combusting the partial oxidation product stream.

18 Claims, 2 Drawing Sheets

METHOD AND SYSTEM FOR COMBUSTING HYDROCARBON FUELS WITH LOW POLLUTANT EMISSIONS BY CONTROLLABLY EXTRACTING HEAT FROM THE CATALYTIC OXIDATION STAGE

TECHNICAL FIELD

The present invention relates to a method and system for combusting hydrocarbon fuels with low pollutant emissions, particularly low $NO_x$ emissions.

BACKGROUND ART

It has long been known that exhaust gases produced by combusting hydrocarbon fuels can contribute to atmospheric pollution. Exhaust gases typically contain pollutants such as nitric oxide (NO) and nitrogen dioxide ($NO_2$), which are frequently grouped together as $NO_x$, unburned hydrocarbons (UHC), carbon monoxide (CO), and particulates, primarily carbon soot. Nitrogen oxides are of particular concern because of their role in forming ground level smog and acid rain and in depleting stratospheric ozone. $NO_x$ may be formed by several mechanisms. The high temperature reaction of atmospheric oxygen with atmospheric nitrogen, particularly at adiabatic flame temperatures above about 2800° F., forms $NO_x$ through the thermal or the Zeldovich mechanism ("thermal $NO_x$"). The reaction of atmospheric nitrogen with hydrocarbon fuel fragments ($CH_i$), particularly under fuel-rich conditions, forms $NO_x$ through the prompt mechanism ("prompt $NO_x$"). The reaction of nitrogen released from a nitrogen-containing fuel with atmospheric oxygen, particularly under fuel-lean conditions, forms $NO_x$ through the fuel-bound mechanism ("fuel-bound $NO_x$"). In typical combustors, atmospheric oxygen and nitrogen are readily available in the combustion air which is mixed with the fuel.

While acknowledging a need to control atmospheric pollution, the more advanced combustion control schemes developed during the past decade were designed to maximize combustion efficiency to maintain economic operation with only a secondary regard for pollutant emissions. For example, the production of CO and UHC was considered undesirable, more because it indicated poor combustion efficiency than because CO and UHC are pollutants. To maximize combustion efficiency and flame stability, fuel is often burned in a diffusion flame at fuel/air ratios as near as possible to stoichiometric, that is, at equivalence ratios of slightly less than 1.0. The equivalence ratio is the ratio of the actual fuel/air ratio to the stoichiometric fuel/air ratio. An equivalence ratio of greater than 1.0 indicates fuel-rich conditions, while an equivalence ratio of less than 1.0 indicates fuel-lean conditions. Burning a fuel at an equivalence ratio slightly less than 1.0 produces nearly complete combustion, minimizing CO and UHC production, and a hot flame, maximizing useable energy. The temperatures produced during such an operation are high enough to produce appreciable quantities of thermal $NO_x$. Therefore, the goal of achieving good thermal efficiency, which arises from economic concerns, is seemingly at odds with the goal of minimizing $NO_x$ emissions, which arises from environmental concerns and is required by increasingly stringent environmental regulations.

Several fairly simple methods are available to decrease $NO_x$ emissions, although none are entirely satisfactory. For example, the formation of fuel-bound $NO_x$ can be minimized or avoided entirely by burning a low nitrogen or nitrogen-free fuel. However, burning a low nitrogen fuel does nothing to reduce the formation of thermal or prompt $NO_x$. The formation of thermal $NO_x$ can be reduced by operating under uniformly fuel-lean conditions, such as by using a lean diffusion flame or a lean premixed/prevaporized (LPP) system. The excess air used to achieve fuel-lean combustion acts as a diluent to lower flame temperatures, thereby reducing the amount of thermal $NO_x$ formed. The formation of prompt $NO_x$ can also be reduced by operating under fuel-lean conditions because the excess air decreases the concentration of $CH_i$ available to react with atmospheric nitrogen. However, the extent to which thermal and prompt $NO_x$ formation can be reduced by fuel-lean combustion may be limited by flame instability which occurs at very lean conditions.

Accordingly, what is needed in the art is a method and system for efficiently combusting hydrocarbon fuels while minimizing pollutant emissions, particularly $NO_x$ emissions.

DISCLOSURE OF THE INVENTION

The present invention is directed to a method and system for efficiently combusting hydrocarbon fuels while minimizing pollutant emissions, particularly $NO_x$ emissions.

One aspect of the invention includes a method of combusting a hydrocarbon fuel. The fuel is mixed with a first air stream to form a fuel/air mixture having an equivalence ratio greater than 1 and partially oxidized by contacting the fuel/air mixture with an oxidation catalyst in a catalytic oxidation stage, thereby generating a heat of reaction and a partial oxidation product stream comprising hydrogen and carbon oxides. The partial oxidation product stream is mixed with a second air stream and completely combusted in a main combustor at a condition at which appreciable quantities of thermal $NO_x$ are not formed, thereby generating an effluent gas stream containing decreased amounts of thermal and prompt $NO_x$.

Another aspect of the invention includes a system for combusting a hydrocarbon fuel which includes, in combination, means for mixing the fuel with a first air stream to form a fuel/air mixture having an equivalence ratio greater than 1, a catalytic oxidation stage containing an oxidation catalyst capable of partially oxidizing the fuel to generate a heat of reaction and a partial oxidation product stream comprising hydrogen and carbon oxides, means for mixing the partial oxidation product stream with a second air stream, and a main combustor capable of completely combusting the partial oxidation product stream to generate an effluent gas stream.

The foregoing and other features and advantages of the present invention will become more apparent from the following description and accompanying drawings.

2 and a prior art combustion system as a function of the equivalence ratio in the main combustor primary zone.

BEST MODE FOR CARRYING OUT THE INVENTION

The present invention uses a combination of three approaches, partial oxidation by catalytic means, thermal management, and flame stability enhancement to control $NO_x$ and other pollutant emissions while permitting thermally efficient combustion of hydrocarbon fuels in a wide variety of combustion devices including residential heating units, industrial process heaters, industrial gas turbines, aircraft gas turbines, and advanced aircraft engines such as those contemplated for the high speed civil transport and national aerospace plane projects. These aspects of the present invention may be better understood by referring to FIG. 1, which is a schematic of a basic embodiment of the present invention.

Figure 1:
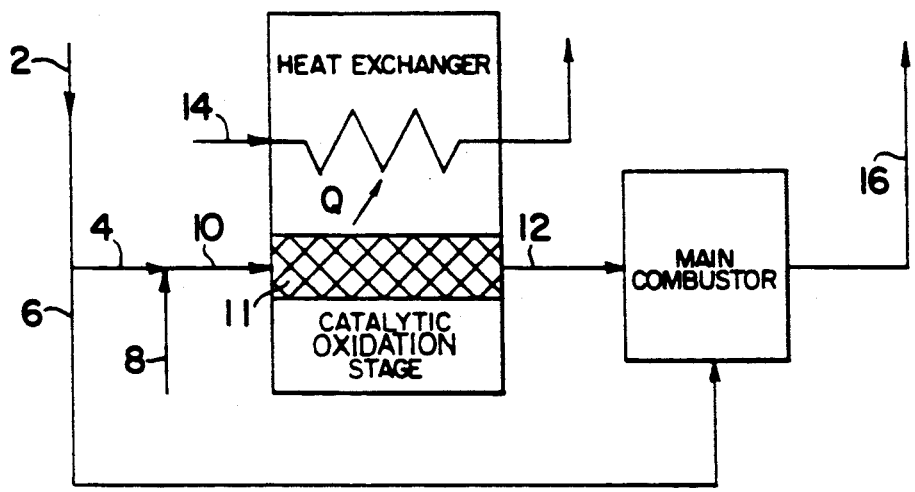
FIG. 1 is a schematic representation of a basic combustion system of the present invention.

As shown in FIG. 1, an air stream 2, which may be any oxygen containing stream and may be at any suitable temperature and pressure, may be split into two smaller streams, a first air stream 4 and a second air stream 6. The first air stream 4 is mixed with a fuel stream 8, which may be at any suitable temperature and pressure, to form a fuel/air mixture 10 which has an equivalence ratio greater than one. The equivalence ratio may be greater than about 2 and, preferably, will be between about 2.5 and about 8. Most preferably, the equivalence ratio will be between about 3 and about 5. The fuel may comprise $C_1$ to $C_{20}$ hydrocarbons, $C_1$ to $C_{20}$ hydrocarbon oxygenates, and blends thereof. Suitable gaseous fuels include natural gas and propane. Suitable liquid fuels include kerosine, No. 1 heating oil, No. 2 heating oil, and conventional aviation turbine fuels such as Jet A, Jet B, JP-4, JP-5, JP-7, and JP-8. If the fuel is a liquid, it should be vaporized or atomized before mixing with the air or while being mixed with the air. Any conventional means known in the art may be used to vaporize or atomize the fuel.

The fuel/air mixture 10 flows into a catalytic oxidation stage where it is contacted with an oxidation catalyst 11 and partially oxidized to generate a heat of reaction and a partial oxidation product stream 12 comprising $H_2$, carbon oxides, primarily CO, and unreacted hydrocarbon fuel. Catalytic oxidation in this context means a flameless, rapid oxidation or oxidative pyrolysis reaction carried out at a temperature below that required to support thermal combustion, that is, conventional combustion with a flame, and below which thermal $NO_x$ forms in appreciable amounts. Partial oxidation means that there is insufficient oxygen available to completely convert the fuel to $CO_2$ and $H_2O$ and to fully liberate the chemical energy stored in the fuel. Partially oxidizing the fuel to $H_2$, CO, and other carbon oxides by catalytic means reduces the amount of hydrocarbon fuel available to form $CH_i$ fragments in a downstream thermal combustor flame front and therefore, reduces the amount of prompt $NO_x$ formed in downstream combustion. The amount of $H_2$, CO, and unreacted hydrocarbon fuel actually formed depends on the temperature in the catalytic oxidation stage, which may range from about 300° F. to about 1800° F. At higher temperatures, relatively more fuel is converted to $H_2$ and CO than at lower temperatures due to changes in the equilibrium product composition. The oxidation catalyst may be any catalyst capable of partially oxidizing the fuel. Suitable catalysts include platinum family metals such as platinum, rhodium, iridium, ruthenium, palladium, and mixtures thereof; chromium oxides; cobalt oxides; and alumina. Preferably, the catalyst will be capable of initiating the partial oxidation reaction at the conditions prevailing in the catalytic oxidation stage, that is, without the addition of heat from an external source. In some applications, however, the catalyst may be preheated using a secondary working fluid, resistive heating, or temporary thermal combustion upstream of the catalyst. The catalyst may be supported on alumina or a similar substrate and may be in any conventional form, including granules, extrudates, or a coating on a metal heat exchanger surface, metal foil, metal honeycomb, or ceramic honeycomb. The preferred catalysts include platinum family metals, especially platinum-rhodium deposited on an alumina support. If desired, more than one catalyst may be incorporated into a graded catalyst bed. The catalytic oxidation stage may be designed according to conventional catalytic reactor design techniques.

At the same time the partial oxidation reaction takes place, a portion of the heat of reaction may be extracted from the catalytic oxidation stage by heat transfer stream 14 to control the temperature and composition of the partial oxidation product stream 12. This operation will be referred to as thermal management. Extracting a small amount of heat or no heat from the catalytic oxidation stage produces a relatively hot partial oxidation product stream having a relatively large amount of $H_2$ and relatively lower amounts of unreacted hydrocarbon fuel. As a result, relatively little prompt $NO_x$ will be formed in downstream combustion. Extracting a relatively large amount of heat from the catalytic oxidation stage produces a relatively cool partial oxidation product stream having a relatively lower amount of $H_2$ and a relatively larger amount of unreacted hydrocarbon fuel. Any increase in prompt $NO_x$ resulting from the larger amount of unreacted hydrocarbon fuel will be at least partially offset by a reduction in thermal $NO_x$ formed in a downstream thermal combustor where the cooler partial oxidation product stream produces a lower adiabatic flame temperature. By using thermal management to control the temperature and composition of the partial oxidation product stream, the total amount of $NO_x$ formed in the combustion system can be controlled to suit specific operating conditions. Thermal management may be used to extract up to about 50% of the heat of reaction generated in the catalytic oxidation stage. Preferably, up to about 20% of the heat of reaction will be extracted and, most preferably, about 3% to about 20% of the heat of reaction will be extracted. If desired, the heat extraction may take place downstream of the catalytic oxidation stage, in which case only the temperature of the partial oxidation product stream 12 may be controlled. A heat exchanger may be used to extract a portion of the heat of reaction. The heat exchanger may be designed according to conventional heat exchanger design techniques and may be an integral part of the catalytic oxidation stage or may be a separate unit. The heat transfer stream 14 may initially be at any temperature which permits heat to be extracted from the catalytic oxidation stage or partial oxidation product stream, while its temperature after thermal management will depend on the amount of heat extracted. The heat transfer stream 14 may be air, water, or another medium and, after thermal management, can be used in any capacity for which a person skilled in the art would consider such a heated stream to be useful. Effective use of the heat transfer stream 14 permits the thermal efficiency of the present invention to be at least as good as a conventional combustion system.

After catalytic oxidation and thermal management, the cooled partial oxidation product stream 12 is mixed with the second air stream 6 in a main combustor and is completely combusted by a thermal combustion reaction, generating an exhaust gas stream 16. The cooled partial oxidation product stream may be mixed with the second air stream prior to combustion or in a diffusion flame. Preferably, the adiabatic flame temperature in the main combustor will be less than about 2800° F. to minimize the formation of thermal $NO_x$. The adiabatic flame temperature and flame stability characteristics in the main combustor depend on the temperature and composition of the partial oxidation product stream and the equivalence ratio in the combustor. In general, the $H_2$ in the partial oxidation product stream enhances flame stability because $H_2$ is lighter and more reactive than the original fuel and mixes better with the second air stream. Flame stability is especially enhanced when little or no heat is extracted from the catalytic oxidation stage because the partial oxidation product stream will contain more $H_2$ and will be hotter, leading to better mixing. A more stable flame permits the main combustor to be operated at a lower equivalence ratio, which produces a lower adiabatic flame temperature and less thermal $NO_x$. In any case, the main combustor should be operated at an overall equivalence ratio of less than 1.0 to ensure complete combustion. The main combustor may be any combustor suitable for combusting the partial oxidation product stream, including a conventional or advanced combustor, and may have either a single combustion zone or a plurality of combustion zones. Preferably, the main combustor will be a lean premixed prevaporized combustor. The main combustor may be designed according to conventional techniques.

Figure 2:
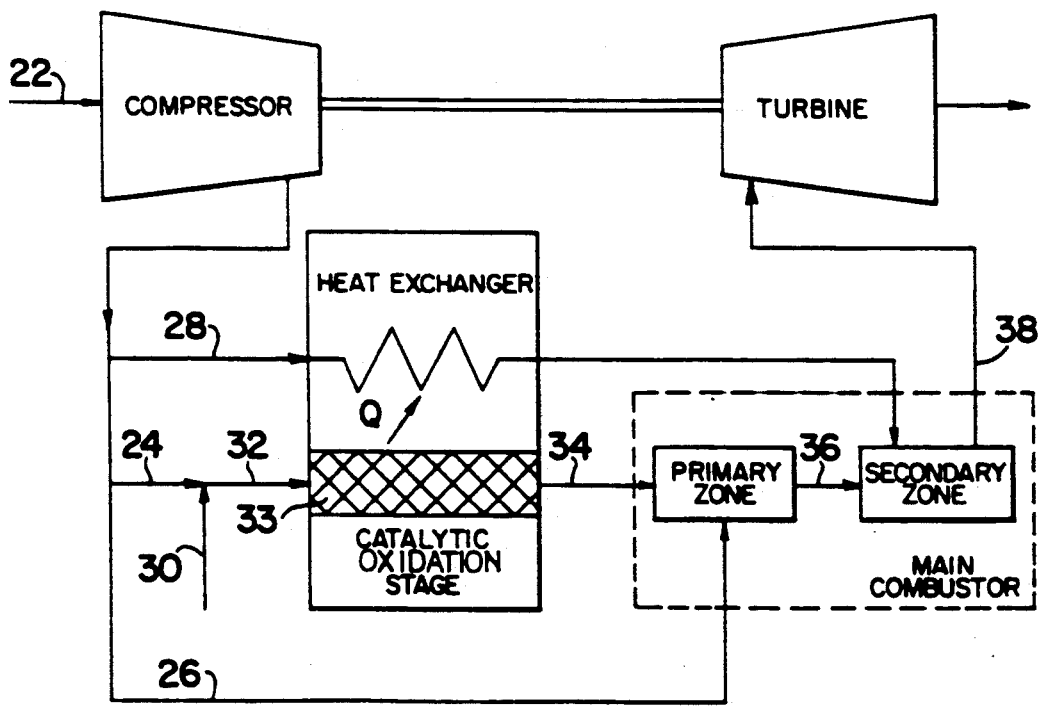
FIG. 2 is a schematic representation of a combustion system of the present invention used in conjunction with a gas turbine engine.

As shown in FIG. 2, combining the present invention with a gas turbine provides some additional benefits. Air stream 22 enters a compressor and is compressed to a suitable temperature and pressure. The air exiting the compressor is controllably divided into three streams, a first air stream 24, a primary air stream 26, and a secondary air stream 28. The first air stream 24 mixes with a fuel stream 30 to form a fuel/air mixture 32 having an equivalence ratio greater than 1.0. The fuel/air mixture 32 enters a catalytic oxidation stage where it is contacted with an oxidation catalyst 33 and partially oxidized to produce a heat of reaction and a partial oxidation product stream 34 comprising $H_2$ and carbon oxides. A portion of the heat of reaction is removed in a heat exchanger by the secondary air stream 28, heating the secondary air stream 28 and cooling the partial oxidation product stream 34. The cooled partial oxidation product stream 34 mixes with the primary air stream 26 and is thermally combusted in a primary zone of a main combustor at a temperature at which appreciable quantities of thermal $NO_x$ are not formed to generate a combustion product stream 36. The fuel/air equivalence ratio in the primary zone may be greater than 1.0, or less than 1.0, but preferably, will be less than 1.0 to minimize both thermal and prompt $NO_x$ formation. The combustion product stream 36 is diluted with the secondary air stream 28 which may be added to the secondary zone through dilution holes in the main combustor to generate an exhaust gas stream 38. The secondary air dilutes and cools the combustion product stream 36 and returns the heat extracted from the catalytic combustion stage to the exhaust gas stream 38. As a result, the temperature of the exhaust gas stream 38, the thermal efficiency of the combustion system, and the amounts of CO and UHC in the exhaust gas are nearly identical to what they would have been if a conventional combustion scheme had been used. Alternately, instead of using all of the secondary air stream 28 as dilution air, a portion of the secondary air stream 28 may be added to the primary zone to provide additional combustion air. After exiting the secondary zone, the exhaust gas stream 38 is expanded across a turbine to produce shaft work to drive the compressor. The exhaust gases may also be used for propulsion or to produce additional shaft work.

A system such as that depicted in FIG. 2 can provide gas turbines with significant additional operating flexibility, particularly when the turbines are operated off peak power. The improved flame stability provided by burning a lighter, more reactive fuel in the main combustor provides wider flammability limits than are available from other fuels, permitting combustion to be maintained at lower equivalence ratios. Additionally, the ability to control the division of the air stream into a primary stream and a secondary stream can be used to provide dynamic control of the equivalence ratio in the primary zone so that it is kept constant as power levels are changed.

EXAMPLE 1

A gas turbine engine incorporating a catalytic oxidation stage and a two zone main combustor as shown in FIG. 2 was modelled on a computer using conventional techniques which are well known in the art. The catalytic oxidation stage was represented by a detailed chemical kinetic model, the main combustor primary zone was represented by a perfectly stirred reactor, and the main combustor secondary zone was represented by a plug flow reactor. Compressed air at 18.9 atmospheres and 847° F. was split into three streams: 7.5% of the air to the first air stream, 42.5% of the air to the primary air stream, and 50% of the air to the secondary air stream. The first air stream was mixed with methane, which was at 80° F., to form a fuel/air mixture which had an equivalence ratio of 4.0 and a temperature of 564° F. The fuel/air mixture was partially oxidized in the catalytic oxidation stage to produce a partial oxidation product stream comprising 12 volume percent (vol %) $CH_4$, 8 vol % CO, and 19 vol % $H_2$. The residence time in the catalytic oxidation stage was 20 milliseconds (msec) and the temperature was maintained at 1340° F. by using thermal management to heat the secondary air stream to 1192° F. The partial oxidation product stream, which exited the catalytic stage at 1340° F., was mixed with the primary air stream in the main combustor primary zone and thermally combusted with a residence time of 0.1 msec and an equivalence ratio of 0.6. The combustion product stream, which was at 2750° F. and contained 6 parts per million (ppm) NO and 6,000 ppm CO, was mixed with the secondary air stream in the main combustor secondary zone with a residence time of 6.0 msec and an equivalence ratio of 0.3 to produce an exhaust gas stream. The exhaust gas stream exited the secondary zone at 2049° F. and contained 3 ppm NO and 6 ppm CO.

EXAMPLE 2

Figure 3:
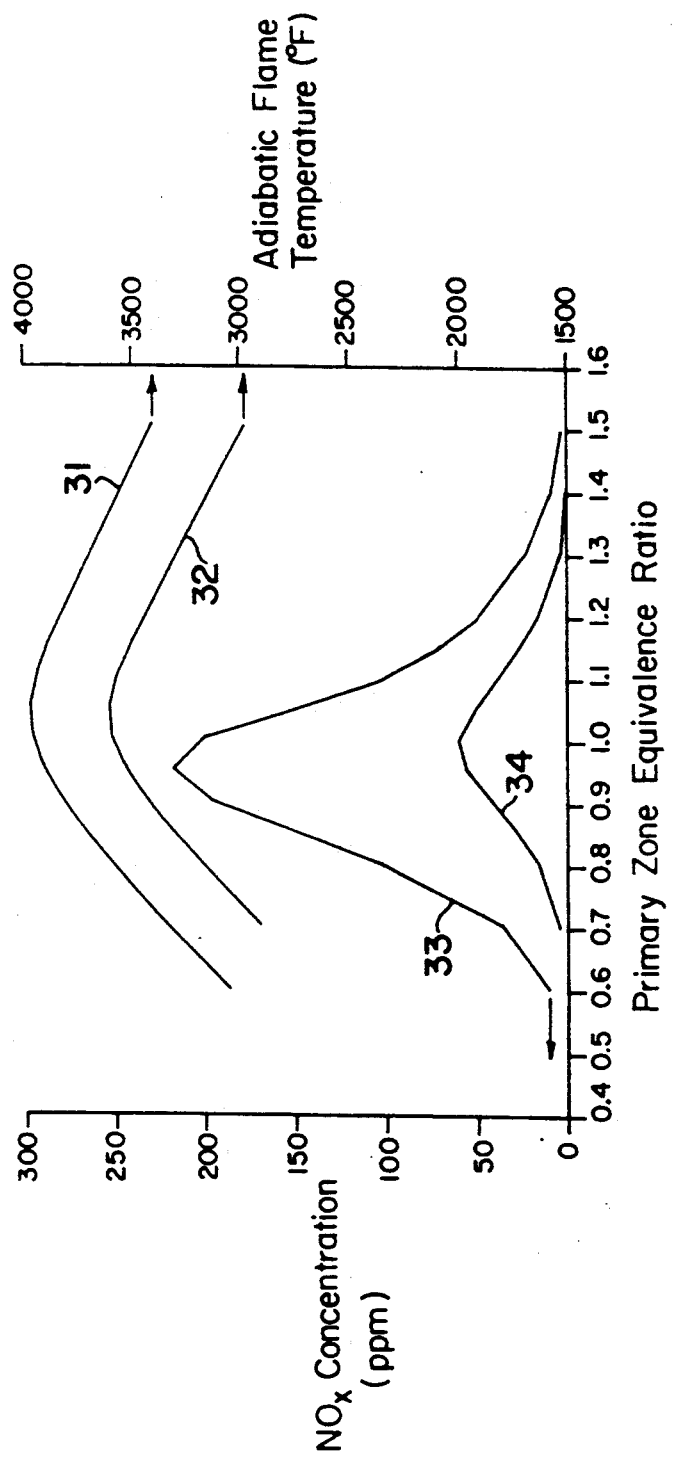
FIG. 3 depicts adiabatic flame temperature and $NO_x$ emissions from the combustion system depicted in FIG.

The model from Example 1 was used to model a range of operations in the main combustor. Conditions in the catalytic oxidation stage were maintained at 1250° F. and an equivalence ratio of 4 for all cases. Methane and natural gas were used as the fuels for this example. The equivalence ratio in the primary zone was varied from 0.6 to 1.5 and the adiabatic flame temperature was permitted to vary accordingly. The equivalence ratio in the secondary zone was fixed at 0.3. A model of a prior art combustion system with an identical main combustor but lacking a catalytic oxidation stage was also prepared. The model of the prior art system was run at the same conditions as the first model, except that methane, instead of a partial oxidation product stream, was fed to the primary zone. Data from both models are presented in FIG. 3. Curves 31 and 32 and the right hand scale show the primary zone adiabatic flame temperatures computed for the various primary zone equivalence ratios. Curves 33 and 34 and the left hand scale show the computed $NO_x$ concentrations in the secondary zone exhaust gas for the various primary zone equivalence ratios. Curves 31 and 33 represent operations with the prior art combustion system. Curves 32 and 34 represent operations with the present invention. FIG. 3 demonstrates that the present invention can reduce $NO_x$ emission levels by a factor of three to five at a given equivalence ratio and can reduce adiabatic flame temperatures by several hundred degrees at a given equivalence ratio.

The present invention is capable of providing several benefits over the prior art. First, it provides three techniques, partial oxidation by catalytic means, thermal management, and flame stabilization, by which $NO_x$ and other pollutant emissions can be reduced while maintaining good thermal efficiency. The extent to which any of the three techniques is used can be varied to optimize the combustion system operation and design.

Second, because many of the hydrocarbon molecules in the fuel are converted to $H_2$ and carbon oxides in the catalytic oxidation stage, fewer hydrocarbon molecules are available for soot production in the main combustor. Lower soot production results in fewer particulate emissions and less radiative heat transfer to combustor walls. Third, the decrease in adiabatic flame temperatures in the main combustor due to thermal management, combined with less radiative heating, can prolong the life of combustor materials or permit the use of less expensive materials.

Fourth, the ability to control the amount of air directed to the primary and secondary zones of the main combustor permits dynamic control of the equivalence ratio in the primary zone for off peak operations. Such a control scheme would be particularly beneficial in gas turbines.

Fifth, the present invention has the flexibility to be used with rich-burn-quench-lean-burn, or other advanced combustion techniques to further reduce $NO_x$ emissions.

It should be understood that the invention is not limited to the particular embodiments shown and described herein, but that various changes and modifications may be made without departing from the spirit or scope of the claimed invention.

What is claimed is:

1. A method of combusting hydrocarbon fuel, comprising:

(a) mixing the fuel with a first air stream to form a fuel/air mixture having an equivalence ratio greater than 1;

(b) partially oxidizing the fuel by contacting the fuel/air mixture with an oxidation catalyst in a catalytic oxidation stage, thereby generating a heat of reaction and a partial oxidation product stream comprising hydrogen and carbon oxides;

(c) controllably extracting up to about 50% of the heat of reaction from the catalytic oxidation stage at the same time the fuel is partially oxidized to control the temperature and composition of the partial oxidation product stream, wherein the temperature of the partial composition product stream affects the amount of thermal $NO_x$ formed in a main combustor downstream of the catalytic oxidation stage, the composition of the partial oxidation product stream determines the amount of prompt $NO_x$ formed in the main combustor, and the temperature and composition of the partial oxidation product stream affect the stability of a flame in the main combustor;

(d) mixing the partial oxidation product stream with a second air stream; and (e) completely combusting the partial oxidation product stream in the main combustor at a condition at which appreciable quantities of thermal $NO_x$ are not formed, thereby generating an effluent gas stream, wherein the temperature and composition of the partial oxidation product stream are selected to control simultaneously the amounts of thermal $NO_x$ and prompt $NO_x$ formed in the main combustor and the stability of the flame in the main combustor, thereby controlling the total amount of $NO_x$ in the effluent gas stream.

2. The method of claim 1 wherein at least about 3% of the heat of reaction is extracted in step (c).

3. The method of claim 1, further comprising, transferring the heat extracted in step (c) to the effluent gas stream, thereby heating the effluent gas stream.

4. The method of claim 3, further comprising, expanding the heated effluent gas stream across a turbine, thereby producing power.

5. The method of claim 3 wherein the main combustor comprises a primary zone and a secondary zone and the heat extracted in step (c) is transferred to the effluent gas stream in the secondary zone.

6. The method of claim 1 where in the equivalence ratio in the catalytic oxidation stage is at least about 2.

7. The method of claim 1 wherein the oxidation catalyst is selected from the group consisting of platinum, rhodium, iridium, ruthenium, palladium, and mixtures thereof; chromium oxides; cobalt oxides; and alumina.

8. The method of claim 1 wherein the partial oxidation product stream and second air stream are mixed prior to combustion.

9. The method of claim 1 wherein the partial oxidation product stream and second air stream are mixed in a diffusion flame.

10. A method of combusting a hydrocarbon fuel in a gas turbine engine, comprising:

(a) compressing an air stream in a compressor;

(b) controllably dividing the air stream into a first air stream, a primary air stream, and a secondary air stream;

(c) mixing the fuel with the first air stream to form a fuel/air mixture having an equivalence ratio greater than 1;

(d) partially oxidizing the fuel by contacting the fuel/air mixture with an oxidation catalyst in a catalytic oxidation stage, thereby generating a heat of reaction and a partial oxidation product stream comprising hydrogen and carbon oxides;

(e) controllably transferring up to about 50% of the heat of reaction from the catalytic oxidation stage to the secondary air stream to control the temperature and composition of the partial oxidation product stream, wherein the temperature of the partial oxidation product stream affects the amount of thermal $NO_x$ formed in a main combustor downstream of the catalytic oxidation stage, the composition of the partial oxidation product stream determines the amount of prompt $NO_x$ formed in the main combustor, and the temperature and composition of the partial oxidation product stream affect the stability of a flame in a primary zone of the main combustor;

(f) mixing the partial oxidation product stream with the primary air stream;

(g) combusting the partial oxidation product stream in the primary zone of the main combustor at a condition at which appreciable quantities of thermal $NO_x$ are not formed, thereby generating a combustion product stream;

(h) mixing the combustion product stream with the heated secondary air stream, thereby generating an effluent gas stream; and p1 (i) expanding the effluent gas stream across a turbine, thereby producing power, wherein the temperature and composition of the partial oxidation product stream are selected to control simultaneously the amounts of thermal $NO_x$ and prompt $NO_x$ formed in the main combustor and the stability of the flame in the primary zone of the main combustor, thereby controlling the total amount of $NO_x$ in the effluent gas stream.

11. A system for combusting a hydrocarbon fuel, comprising in combination:

(a) means for mixing the fuel with a first air stream to form a fuel/air mixture having an equivalence ratio greater than 1;

(b) a catalytic oxidation stage containing an oxidation catalyst capable of partially oxidizing the fuel to generate a heat of reaction and a partial oxidation product stream comprising hydrogen and carbon oxides;

(c) means for controllably extracting a portion of the heat of reaction from the catalytic oxidation stage at the same time the fuel is partially oxidized to control the temperature and composition of the partial oxidation product stream, wherein the temperature of the partial oxidation product stream affects the amount of thermal $NO_x$ formed in a main combustor downstream of the catalytic oxidation stage, the composition of the partial oxidation product stream determines the amount of prompt $NO_x$ formed in the main combustor, and the temperature and composition of the partial oxidation product stream affect the stability of a flame in the main combustor;

(d) means for mixing the partial oxidation product stream with a second air stream; and (e) a main combustor capable of completely combusting the partial oxidation product stream to generate an effluent gas stream.

12. The system of claim 11, further comprising, means for transferring the extracted heat to the effluent gas stream to heat the effluent gas stream.

13. The system of claim 12, further comprising, means for expanding the heated effluent gas stream across a turbine to produce power.

14. The system of claim 12 wherein the main combustor comprises a primary zone and a secondary zone and means for transferring the extracted heat to the effluent gas stream in the secondary zone.

15. The system of claim 11 wherein the oxidation catalyst is selected from the group consisting of platinum, rhodium, iridium, ruthenium, palladium, and mixtures thereof; chromium oxides; cobalt oxides; and alumina.

16. The system of claim 11 wherein the means for mixing the partial oxidation product stream with a second air stream permit the mixing to occur prior to combustion.

17. The system of claim 11 wherein the means for mixing the partial oxidation product stream with a second air stream permit the mixing to occur in a diffusion flame.

18. A system for combusting a hydrocarbon fuel, comprising in combination:

(a) means for controllably dividing a compressed air stream into a first air stream, a primary air stream, and a secondary air stream;

(b) means for mixing the fuel with the first air stream to form a fuel/air mixture having an equivalence ratio greater than 1;

(c) a catalytic oxidation stage containing an oxidation catalyst capable of partially oxidizing the fuel to generate a heat of reaction and a partial oxidation product stream comprising hydrogen and carbon oxides;

(d) means for controllably transferring a portion of the heat of reaction from the catalytic oxidation stage to the secondary air stream to control the temperature and composition of the partial oxidation product stream, wherein the temperature of the partial oxidation product stream affects the amount of thermal $NO_x$ formed in a main combustor downstream of the catalytic oxidation stage, the composition of the partial oxidation product stream determines the amount of prompt $NO_x$ formed in the main combustor, and the temperature and composition of the partial oxidation product stream affect the stability of a flame in a primary zone of the main combustor;

(e) means for mixing the partial oxidation product stream with the primary air stream;

(f) a primary zone of a main combustor capable of combusting the partial oxidation product stream to generate a combustion product stream;

(g) means for mixing the combustion product stream with the heated secondary air stream;

(h) a secondary zone of the main combustor capable of diluting the combustion product stream to generate an effluent gas stream.

* * * * *